(12) United States Patent
Deriche

(10) Patent No.: US 11,027,471 B2
(45) Date of Patent: Jun. 8, 2021

(54) SYSTEM FOR CONTROLLING A SHUTTER OF A PLASTICS INJECTION SYSTEM

(71) Applicant: RUNIPSYS EUROPE, Mery (FR)

(72) Inventor: Eric Deriche, Mery (FR)

(73) Assignee: RUNIPSYS EUROPE, Mery (FR)

( * ) Notice: Subject to any disclaimer, the term of this patent is extended or adjusted under 35 U.S.C. 154(b) by 324 days.

(21) Appl. No.: 16/320,430

(22) PCT Filed: Jul. 27, 2017

(86) PCT No.: PCT/FR2017/052120
§ 371 (c)(1),
(2) Date: Jan. 24, 2019

(87) PCT Pub. No.: WO2018/020177
PCT Pub. Date: Feb. 1, 2018

(65) Prior Publication Data
US 2020/0180201 A1 Jun. 11, 2020

(30) Foreign Application Priority Data

Jul. 28, 2016 (FR) ..................................... 1657287

(51) Int. Cl.
*B29C 45/82* (2006.01)
*B29C 45/28* (2006.01)
*B29C 45/76* (2006.01)

(52) U.S. Cl.
CPC ............ *B29C 45/82* (2013.01); *B29C 45/281* (2013.01); *B29C 45/7613* (2013.01);
(Continued)

(58) Field of Classification Search
CPC . B29C 45/82; B29C 45/281; B29C 2045/822; B29C 45/7613;
(Continued)

(56) References Cited

U.S. PATENT DOCUMENTS

| 5,137,680 A | 8/1992 | Hendry |
| 2002/0086086 A1 | 7/2002 | Doyle et al. |

(Continued)

FOREIGN PATENT DOCUMENTS

| CN | 2303830 Y | 1/1999 |
| CN | 104797397 A | 7/2015 |

(Continued)

OTHER PUBLICATIONS

French Preliminary Report on Patentability for French Application No. 1657287, dated Mar. 28, 2017.
(Continued)

*Primary Examiner* — Nahida Sultana
*Assistant Examiner* — Mohamed K Ahmed Ali
(74) *Attorney, Agent, or Firm* — Birch, Stewart, Kolasch & Birch, LLP

(57) ABSTRACT

The invention relates to a system for controlling a shutter arranged to slide in a plastic material injection nozzle, comprising:
a hydraulic or pneumatic actuating cylinder (1) coupled to said shutter to make it slide between a shutting off position of the nozzle and a maximum opening position of the nozzle,
a device (2) for controlling the actuating cylinder (1), comprising at least two elements among:
an element adapted to regulate the stroke of the actuating cylinder to a first constant speed,
an element adapted to regulate the stroke of the actuating cylinder to a second constant speed, greater than the first speed,
an element adapted to selectively block the stroke of the actuating cylinder,
a sequential control unit comprising at least two control paths (30, 31, 32) configured to send selectively an
(Continued)

electrical control signal to the device (2) via one and/or the other of said control paths (30,31,32) such that:

under the effect of a first signal sent via the first control path (30), one of the elements is activated, under the effect of a second signal sent via the second control path (31), another element is activated.

9 Claims, 5 Drawing Sheets

(52) U.S. Cl.
CPC ............... *B29C 2045/822* (2013.01); *B29C 2945/76083* (2013.01); *B29C 2945/76568* (2013.01); *B29C 2945/76688* (2013.01); *B29C 2945/76859* (2013.01)

(58) Field of Classification Search
CPC ......... B29C 2945/76083; B29C 2945/76568; B29C 2945/76688; B29C 2945/76859; B29C 2945/76658; B29C 2945/76531; B29C 2945/76551

See application file for complete search history.

(56) References Cited

U.S. PATENT DOCUMENTS

| | | | |
|---|---|---|---|
| 2013/0152572 A1 | 6/2013 | Madderno et al. | |
| 2014/0367892 A1 | 12/2014 | Stone | |
| 2015/0158227 A1* | 6/2015 | Schreyer | B29C 45/7613 264/328.12 |
| 2015/0239161 A1 | 8/2015 | Antunes et al. | |
| 2016/0279701 A1* | 9/2016 | Tomioka | B29C 45/82 |

FOREIGN PATENT DOCUMENTS

| | | |
|---|---|---|
| EP | 0269091 A2 | 6/1988 |
| EP | 0322503 A2 | 7/1989 |
| EP | 2226173 A1 | 9/2010 |
| EP | 2604408 B1 | 3/2014 |
| EP | 2679374 B1 | 9/2016 |
| EP | 2931491 B1 | 2/2017 |
| JP | 6-64002 A | 3/1994 |
| JP | 9-1600 A | 1/1997 |
| WO | WO 2010/101709 A2 | 9/2010 |
| WO | WO 2014/031826 A2 | 2/2014 |
| WO | WO 2014/209857 A1 | 12/2014 |

OTHER PUBLICATIONS

International Search Report and Written Opinion of the International Searching Authority for International Application No. PCT/FR2017/052120, dated Oct. 19, 2017.

French Search Report, dated Oct. 10, 2019, for French Application No. FR1872536.

Chinese Office Action and Search Report for Chinese Application No. 201780055406.1, dated Jul. 9, 2020, with English translation of the Office Action.

European Notice of Opposition for European Application No. 17754419.4, dated Jan. 21, 2021.

Liu et al., "Fluid power transmission and control," Xidian University Press, Jun. 2016, pp. 349-350 (9 pages total), with English translation.

Zhang et al., "Hydraulic and pneumatic technology question and answer," Hunan Science and & Technology Press, Jun. 2014, p. 116 (5 pages total), with English translation.

Zhao et al., "Application of hydraulic and pneumatic technology," China Atomic Energy Press, Nov. 2012, p. 266 (5 pages total), with English translation.

\* cited by examiner

SYSTEM FOR CONTROLLING A SHUTTER OF A PLASTICS INJECTION SYSTEM

FIELD OF THE INVENTION

The present invention relates to a system for controlling a shutter arranged to slide in a plastic material injection nozzle.

BACKGROUND OF THE INVENTION

An injection system of "hot runner" type normally comprises:
- a manifold delimiting a channel for distributing plastic material and comprising a thermoplastic material outlet, said manifold comprising means making it possible to maintain its temperature, and consequently that of the material transiting in the distribution channel, at a temperature above the limit temperature for the passage of the material in the fluid state,
- an injection nozzle defining at least one portion of a transit passage of which the input is in fluidic connection with the output of the distribution channel, and of which the output emerges substantially in the moulding cavity,
- a shutter mounted to slide longitudinally inside the transit passage and alternately occupying a shutting off position and an opening position thereof,
- control means for making the shutter slide alternately between the shutting off position and the opening position.

The control of the opening and the closing of the shutter is of particular importance for the quality of the parts formed in the moulding cavity, notably in the case of a sequential injection, that is to say when the moulding cavity is supplied by several injection nozzles, the opening and the closing of which are time shifted.

In particular, it is desirable to be able to vary over the course of time the sliding speed of the shutter.

Depending on the technology employed to control the shutter (pneumatic, hydraulic or electric), different solutions have already been implemented to vary the sliding speed of the shutter.

Thus, the document EP 2 679 374 describes a system for controlling a shutter comprising an electric motor coupled to said shutter by a transmission mechanism adapted to transform a rotational movement of the motor into a sliding movement of the shutter. The management of the motor makes it possible to control the sliding speed of the shutter.

The document EP 2 604 408 describes for its part a system for controlling a shutter comprising a hydraulic actuating cylinder coupled to said shutter to make it slide and a hydraulic circuit for controlling the actuating cylinder comprising a bidirectional solenoid valve making it possible to inject or to remove a fluid from the actuating cylinder in order to actuate the shutter in one direction or the other. The hydraulic circuit further comprises, in series with the bidirectional solenoid valve, a proportional control flow regulator managed by a control unit. Depending on the signal transmitted by the control unit, the regulator allows a greater of lesser flow of fluid. Consequently, by adjusting the flow of the regulator, it is possible to vary over time the sliding speed of the shutter in the nozzle.

However, the aforementioned control systems are relatively costly and complex.

The document WO 2014/031826 describes a system for controlling a shutter implementing a hydraulic actuating cylinder. Said system comprises a unidirectional flow regulator and a bypass solenoid valve of said flow regulator. Such a system only allows two speeds of the actuating cylinder: a regulated speed (through the flow regulator) and a maximum speed, not regulated (through the solenoid valve).

However, these two speeds only procure a limited number of possibilities for adjusting the displacement speed of the shutter, insufficient to remedy the appearance problems encountered on injected plastic parts, notably of large dimensions or having important aesthetic constraints.

BRIEF DESCRIPTION OF THE INVENTION

An aim of the invention is to design a system for controlling a shutter making it possible to modulate the speed of the shutter—or even to block its stroke—which is simpler and less expensive than existing systems and which does so whatever the type of actuating cylinder (hydraulic or pneumatic) employed to actuate the shutter.

In accordance with the invention, a system for controlling a shutter arranged to slide in a plastic material injection nozzle is proposed, comprising:
- a hydraulic or pneumatic actuating cylinder coupled to said shutter to make it slide between a shutting off position of the nozzle and a maximum opening position of the nozzle,
- a device for distributing fluid to the actuating cylinder, comprising:
  - a first path in fluidic connection with a first chamber of the actuating cylinder,
  - a second path in fluidic connection with a second chamber of the actuating cylinder,
  - a third path for supplying fluid from a reservoir,
  - a main solenoid valve arranged to establish selectively a fluidic connection between the third path and the first or the second path,
  - at least two elements chosen from:
    - a first unidirectional regulator of the flow of fluid arranged in the fluidic connection between the first path and the first chamber of the actuating cylinder, said first regulator being regulated to a first constant flow,
    - a second unidirectional regulator of the flow of fluid arranged in the fluidic connection between the first path and the first chamber of the actuating cylinder in series or in parallel with the first regulator, said second regulator being regulated to a second constant flow greater than the first flow,
    - a solenoid valve arranged so as to selectively block the circulation of fluid between the first path and the first chamber of the actuating cylinder,
  - at least two electrical control members adapted to displace at least one moveable member so as to selectively establish at least two different configurations of the fluid circuit within the distribution device, said configurations being chosen in such a way that in the course of an opening cycle of the nozzle, the fluid passes successively through each of said at least two elements,
- a sequential control unit comprising at least two control paths each electrically connected to an electric member for controlling the distribution device, said control unit being configured to send selectively an electrical control signal via one and/or the other of said control paths such that:

under the effect of a first signal sent via a first control path, the distribution device adopts a first configuration, under the effect of a second signal sent via a second control path, the distribution device adopts a second configuration different from the first.

According to one embodiment, said system further comprises at least one flow rectifier coupled to at least one unidirectional flow regulator.

Furthermore, the system further comprises a non-return valve arranged in parallel with at least one unidirectional flow regulator.

In a particularly advantageous manner, the system further comprises a solenoid valve arranged so as to selectively establish a fluidic connection between the first chamber of the actuating cylinder and the first or the second unidirectional flow regulator during an opening phase of the shutter.

Preferably, the flow of the first and/or the second regulator is adjustable within a determined flow range.

In a particularly advantageous manner, the actuating cylinder or the shutter is provided with a position sensor and the sequential control unit is configured to control the emission of control signals as a function of the measurements supplied by said position sensor.

Optionally, the sequential control unit is configured to further take into account at least one of the following data: a time of the injection process, a position of a sensor, a pressure or a temperature in the injection tooling, a signal from the press to inject.

According to one embodiment, the sequential control unit is configured to send an electrical control signal in the form of a direct current.

Alternatively, the sequential control unit is configured to send an electrical control signal in the form of an alternating current.

BRIEF DESCRIPTION OF THE DRAWINGS

Other characteristics and advantages of the invention will become clear from the detailed description that follows, with reference to the appended drawings in which.

DETAILED DESCRIPTION OF EMBODIMENTS OF THE INVENTION

Figure 1A:
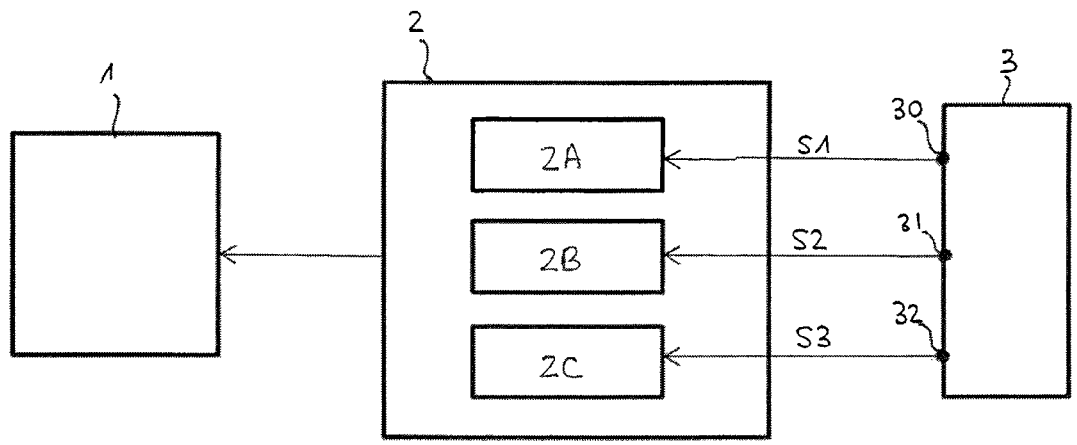
FIGS. 1A and 1B are block diagrams of a system for controlling the shutter according to the embodiments of the invention.

In a manner known per se, the injection system comprises a shutter arranged to slide in a plastic material injection nozzle.

Generally speaking, the system for controlling the shutter comprises an actuating cylinder of which the rod is coupled to said shutter to make it slide between a shutting off position of the nozzle and a maximum opening position of the nozzle.

According to one embodiment, the actuating cylinder is a hydraulic actuating cylinder. Alternatively, the actuating cylinder is a pneumatic actuating cylinder. According to a third embodiment, the actuator is electric.

In all cases, the system for controlling the shutter comprises a device for controlling the actuating cylinder which includes at least two elements from among the following three elements:

an element for regulating the speed of the actuating cylinder regulated to a first constant speed, an element for regulating the speed of the actuating cylinder regulated to a second constant speed, greater than the first speed, an element for blocking the opening stroke of the actuating cylinder.

Depending on the type of actuating cylinder, the speed of the actuating cylinder (and consequently the shutter) is adjusted by a flow of fluid going into or coming out of the actuating cylinder (case of a hydraulic or pneumatic actuating cylinder) or by an electrical signal emitted by a component of an electronic control card to a motor of the actuating cylinder (case of an electric actuator). Similarly, the blockage of the stroke of the actuating cylinder may be obtained by a blockage of the circulation of fluid at the input or at the output of the actuating cylinder (case of a hydraulic or pneumatic actuating cylinder), or by a specific electrical signal emitted by a component of an electronic control card to a motor of the actuating cylinder (case of an electric actuator).

Advantageously, all of these three elements offer the greatest diversity of combinations of speeds/blockages of stroke. However, in practice, the use of only two of these three elements is sufficient to procure a fine adjustment of the stroke of the shutter, capable of substantially improving the quality of the injected parts.

Whatever the technology retained, said elements are electrically controlled by a sequential control unit. Such a control unit, also known as a sequencer, is available on the market according to different models and does not require particular adaptation in order to be able to be used in the present invention.

The sequential control unit comprises at least two control paths, each electrically connected to one of the aforementioned elements.

The sequential control unit is configured to send selectively an electrical control signal via one and/or the other of said control paths to the elements of the device for controlling the actuating cylinder such that:

under the effect of a first signal sent via the first path, the actuating cylinder is moved at a first speed, under the effect of a second signal sent via the second path, the actuating cylinder is moved at a second speed different from the first or its stroke is blocked.

Each control signal may be transmitted in the form of a direct electric current or an alternating current.

In a particularly advantageous manner, the actuating cylinder or the shutter is provided with a position sensor coupled to the sequential control unit and the sequential control unit controls the emission of the control signals as a function of the measurements supplied by said position sensor. The use of such a sensor is known per se and does not need to be described in greater detail in the present text.

The fact of generating the control signals from measurement data of such a position sensor enables a more precise control of the opening-closing sequence than from a purely temporal sequencing.

Furthermore, the sequential control unit may take into account one at least of the following data—combined with the data of the aforementioned position sensor—for the emission of control signals: a time, the position of a sensor (for example: the position of the extrusion screw), a pressure or a temperature in the tool (injection mould or hot runner), a signal from the injection moulding machine (for example: top injection, top holding), etc. These data are commonly recorded during the implementation of the thermoplastic injection process, and the injection moulding machine and the injection tool are equipped with suitable sensors, coupled to an acquisition box. The exploitation of these data thus does not require acquisition means developed specifically for the invention. Those skilled in the art are able to process one or more of said signals and to deduce therefrom a programming of each opening-closing sequence of the shutter.

FIG. 1A is a block diagram of the system for controlling the shutter according to one embodiment.

The actuating cylinder is designated by the number 1. The shutter is not represented in this figure.

The device 2 for controlling the actuating cylinder comprises three elements 2A, 2B, 2C of which one is an element for regulating the speed of the actuating cylinder regulated to a first constant speed (designated slow speed), another is an element for regulating the speed of the actuating cylinder regulated to a second constant speed (designated rapid speed), greater than the first speed, and yet another is an element for blocking the opening stroke of the actuating cylinder. As will be seen below, interactions may exist between the elements 2A, 2B and 2C (notably fluidic connections, in the case of the device for supplying a hydraulic or pneumatic actuating cylinder). However, they are not represented in FIG. 1.

The sequential control unit is designated by the number 3. It comprises three output paths 30, 31, 32, each connected to a respective element 2A, 2B, 2C of the device for controlling the actuating cylinder, making it possible to send thereto a respective control signal S1, S2, S3.

Figure 1B:
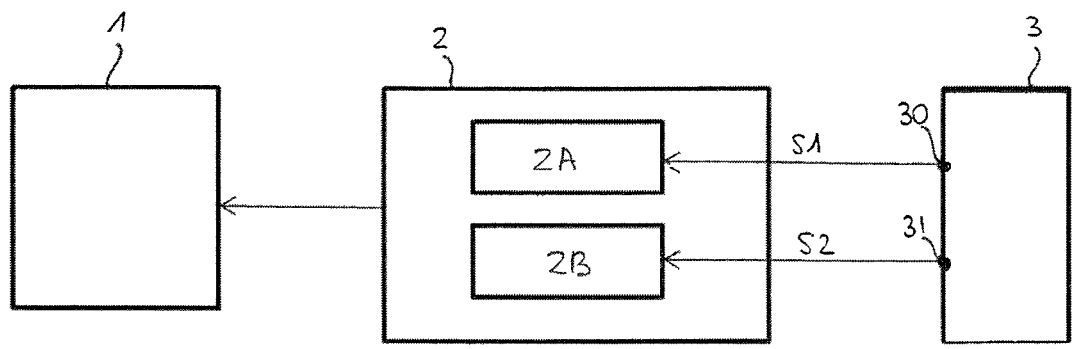

FIG. 1B is a block diagram of the system for controlling the shutter in a simplified embodiment in which the device 2 only comprises two elements 2A, 2B. In this case, only two paths 30, 31 of the sequential control unit 3 are used.

Interest will now be paid more specifically to the case of a hydraulic or pneumatic actuating cylinder.

The actuating cylinder is a double effect actuating cylinder and thus comprises a cylinder defining two chambers isolated from each other by a piston able to slide in said cylinder and integral with the rod. Each of the two chambers comprises a fluid input/output orifice. By convention, it is considered that the maximum opening stroke of the shutter is reached when the volume of fluid in the second chamber is maximal and the volume of fluid in the first chamber is minimal. Conversely, the shutter is in closed position when the volume of fluid in the first chamber is maximal and the volume of fluid in the second chamber is minimal.

The device for controlling the actuating cylinder comprises a device for distributing fluid to the actuating cylinder (the fluid being a liquid in the case of a hydraulic actuating cylinder, a gas in the case of a pneumatic actuating cylinder).

This distribution device comprises:
a first path in fluidic connection with a first chamber of the actuating cylinder,
a second path in fluidic connection with a second chamber of the actuating cylinder,
a third path for supplying fluid from a reservoir.

In the case of a hydraulic actuating cylinder, the distribution device further comprises a fourth path for the return of the fluid to the reservoir. In the case of a pneumatic actuating cylinder, such a fourth path is not necessary, the fluid at the output of the actuating cylinder being returned to the atmosphere.

Furthermore, the distribution device comprises one or two unidirectional regulators of the flow of fluid and two or three solenoid valves arranged so as to selectively establish at least two different configurations of the fluid circuit within the distribution device, in the course of an opening and potentially closing phase of the shutter.

Different embodiments of these solenoid valves and their layout in the fluid circuit will be described in detail with reference to FIGS. 2, 3, 5 and 6.

A first unidirectional regulator of the flow of fluid is arranged in the fluidic connection between the first path and the first chamber of the actuating cylinder. Said first regulator is regulated to a first constant flow.

A second unidirectional regulator of the flow of fluid is arranged in the fluidic connection, in series or in parallel with the first regulator, between the first path and the first chamber of the actuating cylinder. Said regulator is regulated to a second constant flow greater than the first flow.

Even though each of the two unidirectional flow regulators imposes a constant respective flow in the course of an operating cycle of the system for controlling the shutter, it goes without saying that the flow of each of these shutters may be adjustable, for example by means of a control knob, within a given flow range. This optionally makes it possible, between two plastic material injection cycles, to modify the flow imposed by one and/or the other of said regulators. Such unidirectional regulators are available on the market according to different models and do not require particular adaptation to be able to be used in the present invention. By definition, whatever the flow to which they are regulated, these unidirectional flow regulators impose a flow less than the maximum flow of fluid in the circuit. Thus, a solenoid valve in open position cannot be assimilated with a unidirectional flow regulator.

Furthermore, the solenoid valves include electrical control members (typically, electromagnetic coils) adapted to displace at least one moveable member (typically, a slide comprising a plurality of through or blocking channels) so as to selectively establish at least two different configurations of the fluid circuit within the distribution device.

Each of the coils is electrically connected to one of the paths of the sequential control unit.

Each solenoid valve enables the selection of a particular modality of the fluid circuit.

Thus, a first solenoid valve, called main solenoid valve, makes it possible to define the direction of circulation of the fluid within the distribution device. Thus, a position of said solenoid valve enables the fluid to flow from the reservoir to the first chamber of the actuating cylinder and from the second chamber of the actuating cylinder (closing phase of the shutter), whereas another position of the solenoid valve enables the fluid to flow from the reservoir to the second chamber of the actuating cylinder and from the first chamber of the actuating cylinder to the reservoir (opening phase of the shutter). The main solenoid valve may thus be monostable. Optionally, said main solenoid valve may also have a neutral position, in which no fluidic connection is established between the two chambers of the actuating cylinder and the reservoir. In this case, the main solenoid valve is bistable.

A second solenoid valve makes it possible to select a slow or rapid opening speed. To this end, said solenoid valve is coupled selectively—depending on the position of its slide—to the first or to the second unidirectional flow regulator on the route of the fluid between the first chamber of the actuating cylinder and the reservoir. Each unidirectional flow regulator is arranged in parallel with a non-return valve enabling a passage of fluid in the opposite direction of the unidirectional flow regulator. In other words, the non-return valve prevents the passage of fluid during the opening—so as to force the passage of fluid through the unidirectional flow regulator selected during the opening phase—and enables the passage of fluid during the closing phase. The passage of fluid through the non-return valve not being limited in terms of flow, the closing is considered as instantaneous. As will be seen in a particular embodiment below, one of the flow regulators may be arranged in parallel with a flow rectifier, in order to make it possible if need be to impose a determined flow of fluid during the closing phase. In this case, instead of being instantaneous, the closing takes place at the first or at the second speed, depending on the location of the flow rectifier.

Finally, a third solenoid valve makes it possible to selectively block the circulation of fluid between the first chamber of the actuating cylinder and the reservoir during the opening phase and, optionally, during the closing phase.

The table below sets out the different modes for controlling the actuating cylinder capable of being obtained with at least two solenoid valves.

| Embodiment | Main solenoid valve | Opening speed(s) | Blockage of the opening | Closing speed | Blockage of the closing |
|---|---|---|---|---|---|
| 1 | Bistable | 1 (rapid) | Yes | Instantaneous | No |
| 2 | | | | | Yes |
| 3 | | | | Rapid | No |
| 4 | | | | | Yes |
| 5 | | | No | Instantaneous | No |
| 6 | | | | | Yes |
| 7 | | | | Rapid | No |
| 8 | | | | | Yes |
| 9 | | 1 rapid | Yes | Instantaneous | No |
| 10 | | 1 slow | | | Yes |
| 11 | | | | Rapid | No |
| 12 | | | | | Yes |
| 13 | | | No | Instantaneous | No |
| 14 | | | | | Yes |
| 15 | | | | Rapid | No |
| 16 | | | | | Yes |
| 17 | Monostable | 1 (rapid) | Yes | Instantaneous | No |
| 18 | | | | | Yes |
| 19 | | | | Rapid | No |
| 20 | | | | | Yes |
| 21 | | | No | Instantaneous | No |
| 22 | | | | | Yes |
| 23 | | | | Rapid | No |
| 24 | | | | | Yes |
| 25 | | 1 rapid | Yes | Instantaneous | No |
| 26 | | 1 slow | | | Yes |
| 27 | | | | Rapid | No |
| 28 | | | | | Yes |
| 29 | | | No | Instantaneous | No |
| 30 | | | | | Yes |
| 31 | | | | Rapid | No |
| 32 | | | | | Yes |

FIGS. 2, 3, 5 and 6 illustrate respectively the hydraulic diagrams corresponding to embodiments nos 9, 25, 12 and 28, it being understood that those skilled in the art are able, from these examples, to define a hydraulic diagram for each of the other embodiments.

In these figures, the actuating cylinder is assumed to be hydraulic, but those skilled in the art could transpose the teaching of these figures to a pneumatic actuating cylinder without however going beyond the scope of the present invention.

Figure 2:
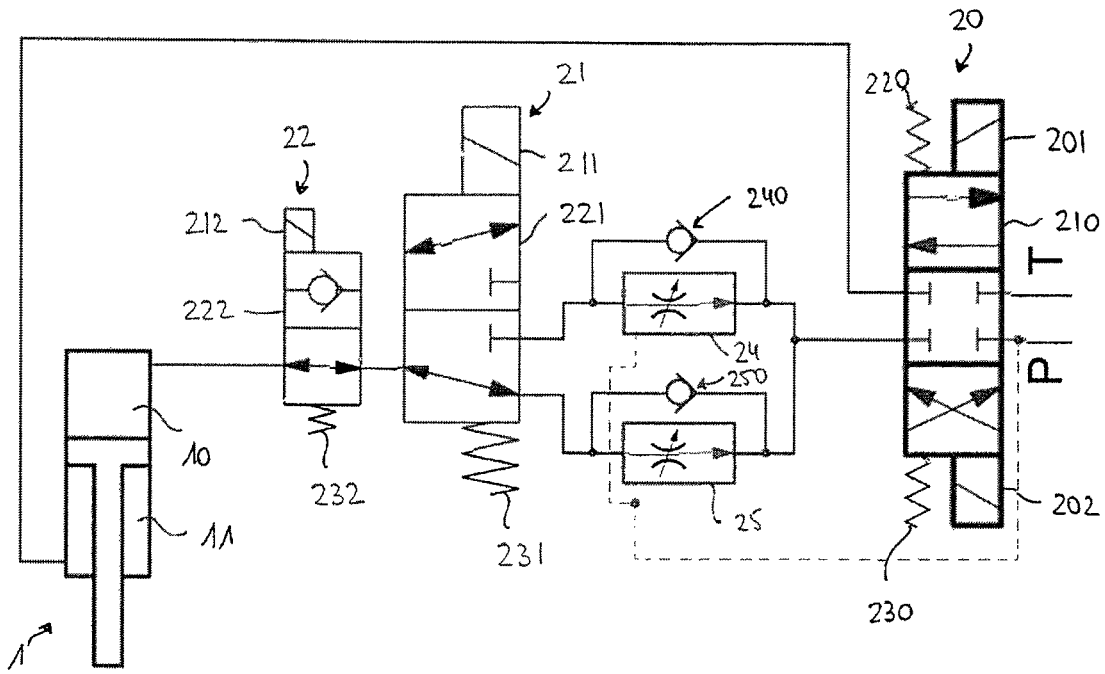
FIG. 2 is a hydraulic diagram of a system for controlling the shutter according to one embodiment of the invention.

FIG. 2 is a hydraulic diagram of embodiment no 9, based on a main bistable solenoid valve 20 and two monostable solenoid valves 21, 22.

The bistable solenoid valve 20 controls the opening or closing phase of the shutter. The monostable solenoid valve 22 controls a potential blocking of the opening of the shutter, whereas the monostable solenoid valve 21 controls a slow or rapid opening speed of the shutter.

In a manner known per se, each monostable solenoid valve 21, 22 comprises an electromagnetic coil 211 (respectively 212), a slide 221 (respectively 222) moveable between a rest position for which the coil is not electrically supplied and an activated position for which the coil is electrically supplied, and a means 231 (respectively 232) for returning the slide to its rest position. Furthermore, the bistable solenoid valve 20 comprises two electromagnetic coils 201, 202, a slide 210 moveable between a rest position where none of the coils 201, 202 is electrically supplied, a first activated position where the coil 201 is electrically supplied and a second activated position where the coil 202 is electrically supplied, and two means 220, 230 for returning the slide.

In the solenoid valve 20, the rest position (which is that illustrated in FIG. 2) blocks the passage of fluid coming from the reservoir to the first chamber 10 of the actuating cylinder 1 and the passage of fluid coming from the second chamber 11 of the actuating cylinder 1 to the reservoir.

On the first path, the two monostable solenoid valves 21, 22 are arranged in series with a mounting in parallel with two unidirectional flow regulators 24, 25 of which each is mounted in parallel with a respective unidirectional non-return valve 240, 250. It is assumed that the first flow regulator 24 imposes a slow speed of the actuating cylinder whereas the second regulator 25 imposes a speed rapid of the actuating cylinder.

When the coil 202 of the solenoid valve 20 is electrically supplied, the slide is displaced upwards (with respect to the configuration illustrated in FIG. 2), thereby enabling the passage of fluid coming from the reservoir to the second chamber 11 of the actuating cylinder and the passage of fluid coming from the first chamber 10 of the actuating cylinder to the reservoir (opening phase of the shutter).

In the solenoid valve 22, the rest position (which is that illustrated in FIG. 2) enables the passage of fluid from the first chamber 10 of the actuating cylinder to the solenoid valve 21. The position of the slide 222 when the coil 212 is electrically supplied (corresponding to a downwards displacement in the configuration illustrated in FIG. 2) blocks the passage of fluid from the first chamber of the actuating cylinder to the solenoid valve 21 and thereby enables a blockage of the opening stroke of the shutter.

In the solenoid valve 21, the rest position (which is that illustrated in FIG. 2) enables the passage of fluid through the second unidirectional flow regulator 25, imposing a rapid opening speed. When the coil 211 of the solenoid valve 21 is electrically supplied, the position of the slide 221 (corresponding to a downwards displacement with respect to the configuration illustrated in FIG. 2) sends the fluid to the first unidirectional flow regulator 24, thereby imposing a slow opening speed of the shutter.

When the coil 201 of the main solenoid valve 20 is electrically supplied, the position of the slide 210 (corresponding to a downwards displacement with respect to the configuration illustrated in FIG. 2) enables the passage of fluid coming from the reservoir to the first chamber 10 of the actuating cylinder and the passage of fluid coming from the second chamber 11 of the actuating cylinder to the reservoir (closing phase of the shutter).

In the solenoid valve 22, the rest position (which is that illustrated in FIG. 2) enables the passage of fluid from the solenoid valve 21 to the first chamber 10 of the actuating cylinder. Similarly, the position of the slide 222 when the coil 212 is electrically supplied (corresponding to a downwards displacement in the configuration illustrated in FIG. 2) enables the passage of fluid from the solenoid valve 21 to the first chamber of the actuating cylinder. In this configuration, it is thus pointless to supply the coil of the solenoid valve 21 during the closing phase.

In the closing phase, the passage of fluid through the flow regulators is not possible; the passage of fluid thus takes place through one of the non-return valves, and the closing speed is considered as instantaneous, the flow not being limited through said non-return valve.

In the solenoid valve 21, the rest position (which is that illustrated in FIG. 2) enables the passage of fluid through the non-return valve 250 arranged in parallel with the second unidirectional flow regulator 25. When the coil 211 of the solenoid valve 21 is electrically supplied, the position of the slide 221 (corresponding to a downwards displacement with respect to the configuration illustrated in FIG. 2) enables the passage of fluid through the non-return valve 240 arranged in parallel with the first flow regulator 24. In this configuration, it is thus pointless to supply the coil of the solenoid valve 21 during the closing phase.

Figure 3:
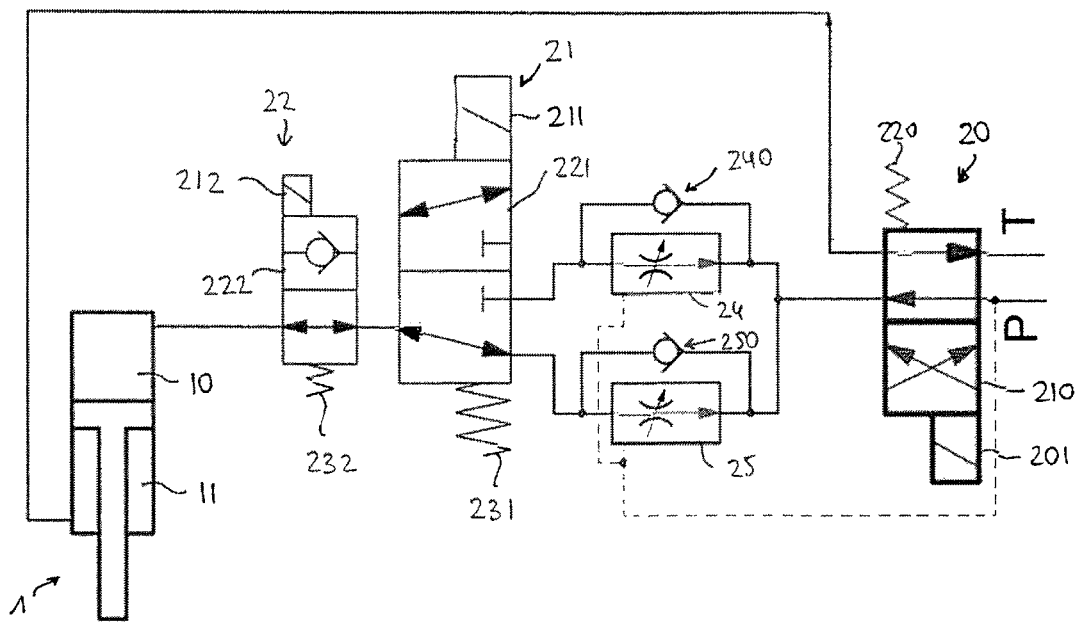
FIG. 3 is a hydraulic diagram of a system for controlling the shutter according to another embodiment of the invention.

FIG. 3 is a hydraulic diagram of embodiment no 25, implementing three monostable solenoid valves 20, 21, 22.

This embodiment is to be compared with that of embodiment no 9, the only difference being that the main solenoid valve 20 which controls the opening or the closing of the shutter is monostable and not bistable. The other elements of the hydraulic circuit will thus not be described again.

At rest (corresponding to the configuration illustrated in FIG. 3), the slide 210 of the solenoid valve 20 enables the passage of fluid from the reservoir to the first chamber 10 of the actuating cylinder and from the second chamber 11 of the actuating cylinder to the reservoir (closing phase of the shutter).

As in embodiment no 9 illustrated in FIG. 2, the solenoid valves 21 and 22 may be left at rest and thereby enable the passage of fluid through the non-return valve 250 arranged in parallel with the second unidirectional flow regulator 25.

When the coil 201 of the solenoid valve 20 is electrically supplied, the slide 210 is displaced (upwards with respect to the configuration illustrated in FIG. 3), thereby enabling the passage of fluid from the reservoir to the second chamber 11 of the actuating cylinder and from the first chamber 10 of the actuating cylinder to the reservoir (opening phase of the shutter).

In the solenoid valve 22, the rest position (which is that illustrated in FIG. 3) enables the passage of fluid from the first chamber 10 of the actuating cylinder to the solenoid valve 21. The position of the slide when the coil 212 is electrically supplied (corresponding to a downwards displacement in the configuration illustrated in FIG. 3) blocks the passage of fluid from the first chamber 10 of the actuating cylinder to the solenoid valve 21 and thereby enables a blockage of the opening stroke of the shutter.

In the solenoid valve 21, the rest position (which is that illustrated in FIG. 3) enables the passage of fluid through the second unidirectional flow regulator 25, imposing a rapid opening speed. When the coil 211 of the solenoid valve 21 is electrically supplied, the position of the slide 221 (corresponding to a downwards displacement with respect to the configuration illustrated in FIG. 3) sends the fluid to the first unidirectional flow regulator 24, thereby imposing a slow opening speed of the shutter.

Figure 4:
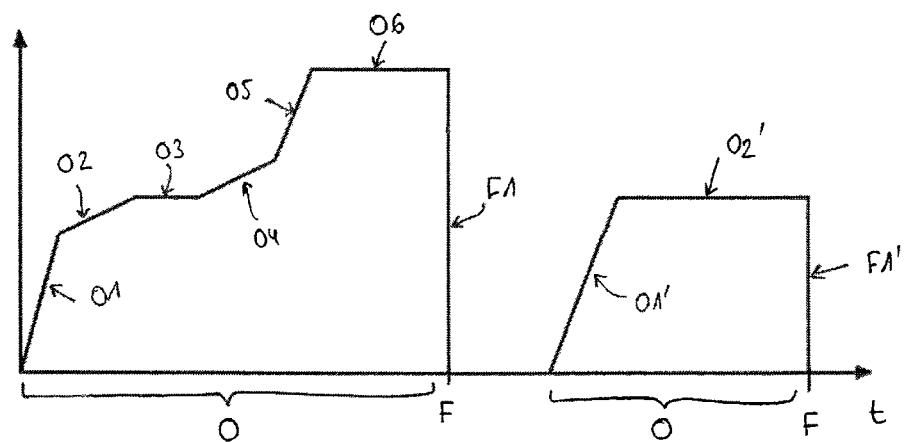
FIG. 4 is a curve of the stroke of the shutter as a function of time in the course of two cycles of opening-closing the shutter capable of being obtained with the embodiments of FIGS. 2 and 3.

FIG. 4 illustrates an example of curve of the stroke of the shutter over time capable of being obtained with embodiments nos 9 and 25.

A zero stroke corresponds to a total closing of the shutter.

A first step O1 of the opening phase O is carried out at rapid speed, the solenoid valve 21 being at rest to provide a fluidic connection between the first chamber 10 of the actuating cylinder and the second unidirectional flow regulator 25.

A second step O2 of the opening phase O is carried out at slow speed, the solenoid valve 21 being actuated to provide a fluidic connection between the first chamber 10 of the actuating cylinder and the first unidirectional flow regulator 24.

A third step O3 of the opening phase O is carried out with the shutter blocked, the solenoid valve 22 being actuated to block the circulation of fluid between the first chamber 10 of the actuating cylinder and the solenoid valve 21.

A fourth step O4 of the opening phase O is carried out at slow speed, the solenoid valve 22 being de-activated and the solenoid valve 21 being activated to provide a fluidic connection between the first chamber 10 of the actuating cylinder and the first unidirectional flow regulator 24.

A fifth step O5 of the opening phase O is carried out at rapid speed, the solenoid valve 21 being at rest to provide a fluidic connection between the first chamber 10 of the actuating cylinder and the second unidirectional flow regulator 25.

In a sixth step O6 of the opening phase O, the maximum opening stroke of the shutter being reached, it is blocked.

The closing step F1 is for its part instantaneous, the fluid passing through one of the non-return valves arranged in parallel with a unidirectional flow regulator.

A second opening-closing sequence comprises a first step O1' at rapid speed, a second step O2' with the shutter blocked, and a step of instantaneous closing F1'.

It goes without saying that the curve of FIG. 4 is only a non-limiting example from among the plurality of sequences that embodiments nos 9 and 25 make it possible to generate.

If it is not wished to be able to block the opening stroke of the shutter but only influence the opening speed, the solenoid valve 22 could be removed from the hydraulic circuit represented in FIGS. 2 and 3.

Similarly, if it not wished to vary the opening speed but to have the possibility of blocking the opening stroke, the solenoid valve 21 and one of the flow regulators could be removed from the hydraulic circuit represented in FIGS. 2 and 3.

Figure 5:
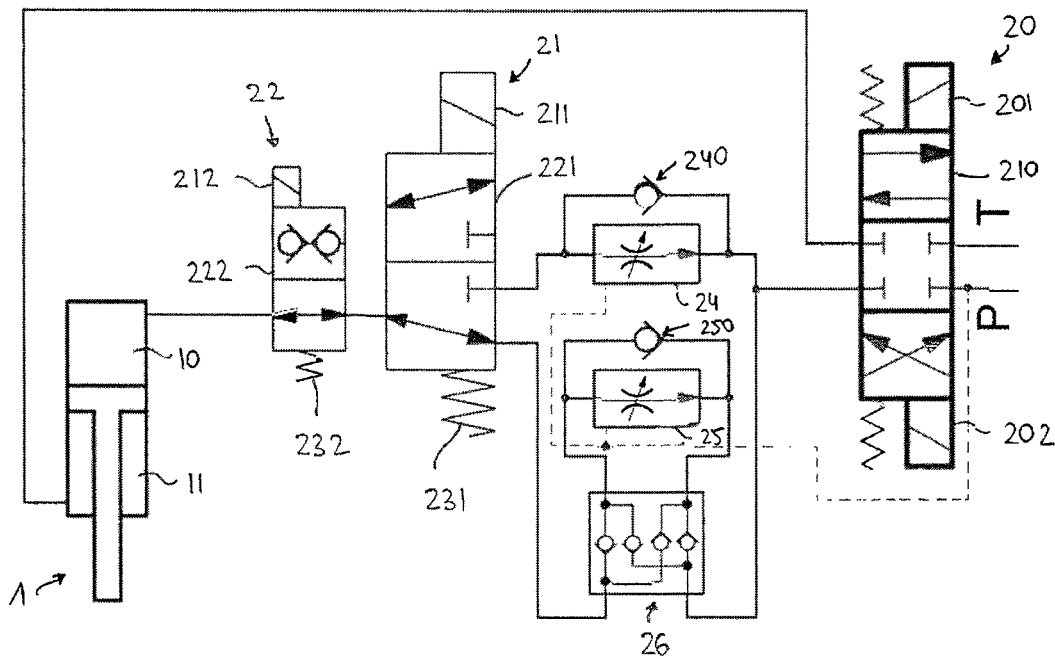
FIG. 5 is a hydraulic diagram of a system for controlling the shutter according to another embodiment of the invention.

FIG. 5 is a hydraulic diagram of embodiment no 12, based on a main bistable solenoid valve 20 and two monostable solenoid valves 21, 22.

Compared to embodiment no 9, the slide of the solenoid valve 22 has an open state at rest and a closed state in both directions when the coil 212 is electrically supplied. Furthermore, a flow rectifier 26 is arranged in parallel with the second unidirectional flow regulator 25. Said flow rectifier 26 comprises a plurality of unidirectional non-return valves arranged in a manner analogous to a diode bridge used to rectify an electric current. More specifically, the valves are arranged such that, when the solenoid valve 21 is at rest, whatever the direction of circulation of the fluid between the first chamber 10 of the actuating cylinder and the reservoir, the fluid still passes through the second unidirectional flow regulator 25. In other words, this flow rectifier 26 makes it possible to impose a rapid closing speed—instead of an instantaneous closing—in addition to the rapid opening speed procured by the unidirectional flow regulator 25 alone.

In the main solenoid valve 20, the rest position (which is that illustrated in FIG. 5) blocks the passage of fluid coming from the reservoir to the first chamber 10 of the actuating cylinder 1 and the passage of fluid coming from the second chamber 11 of the actuating cylinder 1 to the reservoir.

When the coil 202 of the solenoid valve 20 is electrically supplied, the slide is displaced upwards (with respect to the configuration illustrated in FIG. 5), thereby enabling the passage of fluid coming from the reservoir to the second chamber 11 of the actuating cylinder and the passage of fluid coming from the first chamber 10 of the actuating cylinder to the reservoir (opening phase of the shutter).

In the solenoid valve 22, the rest position (which is that illustrated in FIG. 5) enables the passage of fluid from the first chamber 10 of the actuating cylinder to the solenoid valve 21. The position of the slide 222 when the coil 212 is electrically supplied (corresponding to a downwards displacement in the configuration illustrated in FIG. 5) blocks the passage of fluid from the first chamber of the actuating cylinder to the solenoid valve 21 and thereby enables a blockage of the opening stroke of the shutter.

In the solenoid valve 21, the rest position (which is that illustrated in FIG. 5) enables the passage of fluid through the second unidirectional flow regulator 25, imposing a rapid opening speed. When the coil 211 of the solenoid valve 22 is electrically supplied, the position of the slide 221 (corresponding to a downwards displacement with respect to the configuration illustrated in FIG. 5) sends the fluid to the first unidirectional flow regulator 24, thereby imposing a slow opening speed of the shutter.

When the coil 201 is electrically supplied, the position of the slide (corresponding to a downwards displacement with respect to the configuration illustrated in FIG. 5) enables the passage of fluid coming from the reservoir to the first chamber 10 of the actuating cylinder and the passage of fluid coming from the second chamber 11 of the actuating cylinder to the reservoir (closing phase of the shutter).

In the solenoid valve 22, the rest position (which is that illustrated in FIG. 5) enables the passage of fluid from the solenoid valve 21 to the first chamber 10 of the actuating cylinder. The position of the slide 222 when the coil 212 is electrically supplied (corresponding to a downwards displacement in the configuration illustrated in FIG. 5) blocks the passage of fluid from the solenoid valve 21 to the first chamber 10 of the actuating cylinder and thereby enables a blockage of the closing stroke of the shutter.

In the solenoid valve 21, the rest position (which is that illustrated in FIG. 5) enables the passage of fluid through the flow rectifier 26 and the second unidirectional flow regulator 25, imposing a rapid closing speed. When the coil 211 of the solenoid valve 21 is electrically supplied, the position of the slide 221 (corresponding to a downwards displacement with respect to the configuration illustrated in FIG. 5) enables the passage of fluid through the non-return valve 240 arranged in parallel with the first flow regulator 24. The closing of the shutter is then instantaneous.

Figure 6:
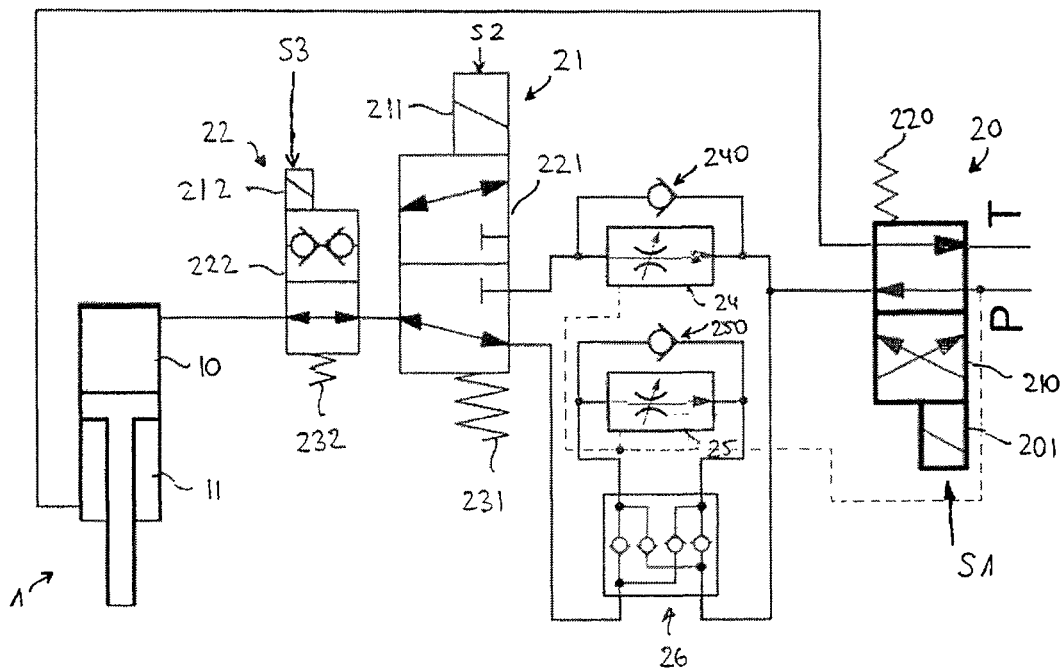
FIG. 6 is a hydraulic diagram of a system for controlling the shutter according to another embodiment of the invention.

FIG. 6 is a hydraulic diagram of embodiment no 28, implementing three monostable solenoid valves 20, 21, 22.

This embodiment is to be compared with that of embodiment no 12 illustrated in FIG. 5, the only difference between these two embodiments being that the main solenoid valve 20 which controls the opening or the closing of the shutter is monostable and not bistable. The other elements of the hydraulic circuit and their operation in the course of a sequence of opening-closing of the shutter will thus not be described again.

Figure 7A:
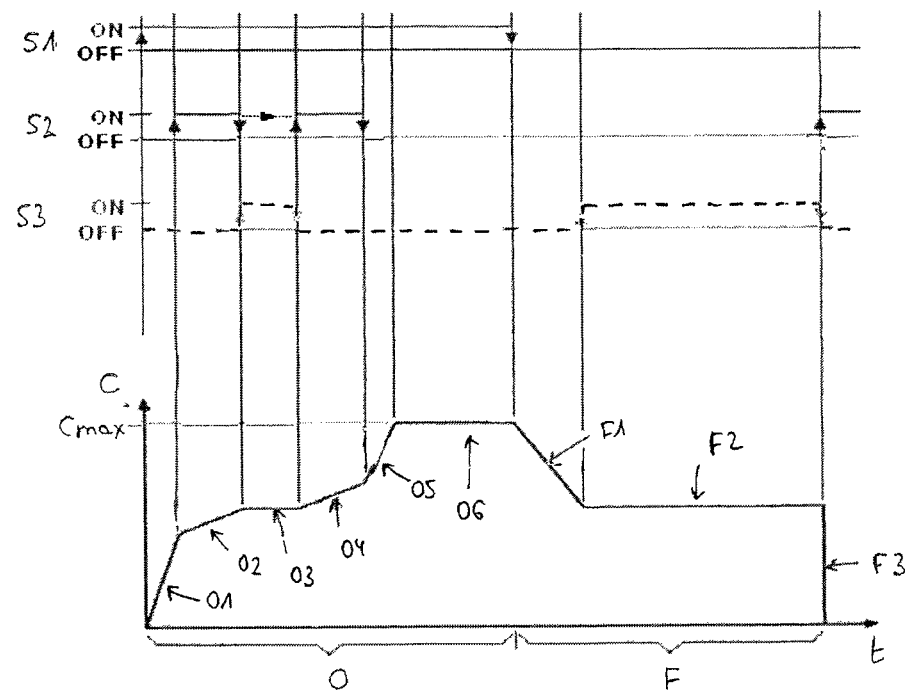
FIGS. 7A and 7B are curves of the stroke of the shutter as a function of time in the course of two cycles of opening-closing the shutter capable of being obtained with the embodiments of FIGS. 5 and 6.
Figure 7B:
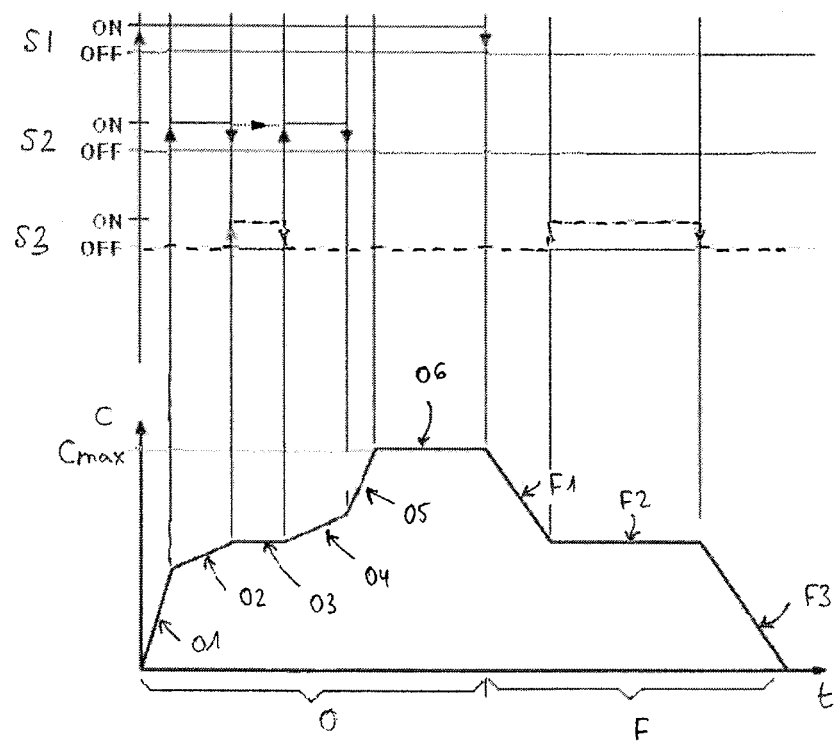

FIGS. 7A and 7B are examples of curves of the stroke C of the shutter in the course of an opening-closing cycle capable of being obtained with embodiments nos 12 and 28.

The signals S1, S2, S3 of each of the three paths of the sequential control unit respectively connected to the solenoid valves 20, 21, 22 have either a zero amplitude (OFF), or an amplitude of a determined value (ON). The OFF state corresponds to an absence of supply of the considered coil.

In a first step O1 of the opening phase O, the signal S1 is in the ON state whereas the signals S2 and S3 are in the OFF state. The actuating cylinder begins its opening stroke at the rapid speed.

In a second step O2 of the opening phase O, the signal S1 is still in the ON state and the signal S2 passes to the ON state (actuation of the solenoid valve 21), the signal S3 remaining in the OFF state. The stroke of the actuating cylinder slows down to the slow speed.

In a third step O3 of the opening phase O, the signal S1 is still in the ON state and the signal S3 passes to the ON state (activation of the solenoid valve 22), the signal S2 passing to the OFF state (de-activation of the solenoid valve 21) or not. The stroke of the actuating cylinder is then blocked.

In a fourth step O4 of the opening phase O, the signal S1 is still in the ON state and the signal S2 passes to the ON state (activation of the solenoid valve 21), the signal S3 passing to the OFF state (de-activation of the solenoid valve 22). The stroke of the actuating cylinder then restarts with the slow speed.

In a fifth step O5 of the opening phase O, the signal S1 is still in the ON state and the signal S2 passes to the OFF state (de-activation of the solenoid valve 21), the signal S3 remaining in the OFF state. The stroke of the actuating cylinder then continues with the rapid speed.

In a sixth step O6 of the opening phase O, the signal S1 is still in the ON state. The maximum opening stroke $C_{max}$ of the shutter being reached, it is blocked.

To engage the closing phase F, the signal S1 passes to the OFF state. The signals S2 and S3 remaining in the OFF state, the fluid passes through the second unidirectional flow regulator 25 through the flow rectifier 26, thereby imposing a rapid closing speed during step F1.

In a second closing step F2, the signal S3 passes to the ON state (activation of the solenoid valve 22) and leads to a blockage of the shutter.

In a third closing step F3, the signal S3 passes to the OFF state (de-activation of the solenoid valve 22) and the signal S2 passes to the ON state (activation of the solenoid valve 21), thereby leading to an instantaneous closing (the fluid passing through the non-return valve 240).

FIG. 7B shows a curve similar to that of FIG. 7A, only differing by the third closing step F3 which is carried out at rapid speed and not instantaneously. This step is implemented while maintaining the solenoid valve 21 at rest (signal S2 remaining at OFF), so as to make the fluid pass through the second unidirectional flow regulator 25 through the flow rectifier 26.

It goes without saying that the curves of FIGS. 7A and 7B are only non-limiting examples among the plurality of sequences that embodiments nos 12 and 28 make it possible to generate.

If it is not wished to be able to block the opening and closing stroke of the shutter but only to influence the opening and closing speed, the solenoid valve 22 could be removed from the hydraulic circuit represented in FIGS. 5 and 6.

Similarly, if it is not wished to vary the opening or closing speed but to have the possibility of blocking the opening or closing stroke, the solenoid valve 21 and one of the flow regulators of the hydraulic circuit represented in FIGS. 5 and 6 could be removed.

Interest will now be paid to the case of an electric actuator.

Unlike the hydraulic actuating cylinder and the pneumatic actuating cylinder, the electric actuator is not supplied with a fluid but with an electric current that supplies a motor coupled to the rod of the actuator.

To this end, the device for controlling the actuator comprises an electronic card comprising at least two electronic components from among:
   a component for regulating the speed of the actuator at a first speed,
   a component for regulating the speed of the actuator at a second speed greater than the first,
   a component for blocking the stroke of the actuator.

The components of the electronic card are programmed beforehand according to techniques known per se.

The sequential control unit is identical to that described for the embodiments relative to the hydraulic actuating cylinder and to the pneumatic actuating cylinder; it will thus not be described again in a detailed manner.

The control unit comprises at least two control paths, each electrically connected to one of the components of the electronic card.

Thus, the sending of a control signal via a first control path to one of the components (for example, a component for regulating the speed of the actuator) triggers the operation of the motor of the actuator so as to obtain the desired slide speed.

A control signal sent via a second control path to the other component (for example, the component for blocking the stroke of the actuator) has the effect of stopping the motor to immobilise the actuator.

It is thus possible to obtain curves of the stroke of the actuator in the course of a sequence of opening-closing the shutter similar to those of FIGS. 4, 7A and 7B.

Finally, it goes without saying that the examples that have been given are only particular illustrations and are in no event limiting with respect to the application fields of the invention.

REFERENCES

EP 2 679 374
EP 2 604 408

The invention claimed is:

1. A system for controlling a shutter arranged to slide in a plastic material injection nozzle, comprising:
   a hydraulic or pneumatic actuating cylinder coupled to said shutter to make it slide between a shutting off position of the nozzle and a maximum opening position of the nozzle,
   a distribution device for distributing fluid to the hydraulic or pneumatic actuating cylinder, comprising:
   a first path in fluidic connection with a first chamber of the hydraulic or pneumatic actuating cylinder,
   a second path in fluidic connection with a second chamber of the hydraulic or pneumatic actuating cylinder,
   a third path for supplying fluid from a reservoir,
   a main solenoid valve arranged to establish selectively a fluidic connection between the third path and the first or the second path,
   at least two elements selected from:
      a first unidirectional regulator of the flow of fluid arranged in the fluidic connection between the first path and the first chamber of the hydraulic or pneumatic actuating cylinder, said first regulator being regulated to a first constant flow,
      a second unidirectional regulator of the flow of fluid arranged in the fluidic connection between the first path and the first chamber of the hydraulic or pneumatic actuating cylinder in series or in parallel with the first regulator, said second regulator being regulated to a second constant flow greater than the first flow,
      a solenoid valve arranged so as to selectively block the circulation of fluid between the first path and the first chamber of the hydraulic or pneumatic actuating cylinder,
   at least two electrical control members adapted to displace at least one moveable member so as to selectively establish at least two different configurations of the fluid circuit within the distribution device, said configurations being selected in such a way that in the course of an opening cycle, the fluid passes successively through each of said at least two elements,
   a sequential control unit comprising at least two control paths each electrically connected to an electric member for controlling the distribution device, said control unit being configured to send selectively an electrical control signal via one and/or the other of said control paths such that:
      under the effect of a first signal sent via a first control path, the distribution device adopts a first configuration,
      under the effect of a second signal sent via a second control path, the distribution device adopts a second configuration different from the first.

2. The system of claim 1, further comprising at least one flow rectifier coupled to at least one unidirectional flow regulator.

3. The system of claim 1, further comprising a non-return valve arranged in parallel with at least one unidirectional flow regulator.

4. The system of claim 1, further comprising a solenoid valve arranged so as to selectively establish a fluidic connection between the first chamber of the hydraulic or pneumatic actuating cylinder and the first or the second unidirectional flow regulator during an opening phase of the shutter.

5. The system of claim 1, wherein the flow of at least one of the first and the second regulator is adjustable within a determined flow range.

6. The system of claim 1, wherein the hydraulic or pneumatic actuating cylinder or the shutter is provided with a position sensor and the sequential control unit is configured to control the emission of the control signals as a function of the measurements supplied by said position sensor.

7. The system of claim 6, wherein the sequential control unit is configured to further take into account at least one of the following data: a time of the injection process, a position of a sensor, a pressure or a temperature in the injection tooling, and a signal from the press to inject.

8. The system of claim 1, wherein the sequential control unit is configured to send an electrical control signal in the form of a direct current.

9. The system of claim 1, wherein the sequential control unit is configured to send an electrical control signal in the form of an alternating current.

* * * * *